J. A. BEDDINGFIELD.
AUTOMOBILE TIRE RIM.
APPLICATION FILED FEB. 1, 1921.
1,408,164. Patented Feb. 28, 1922.
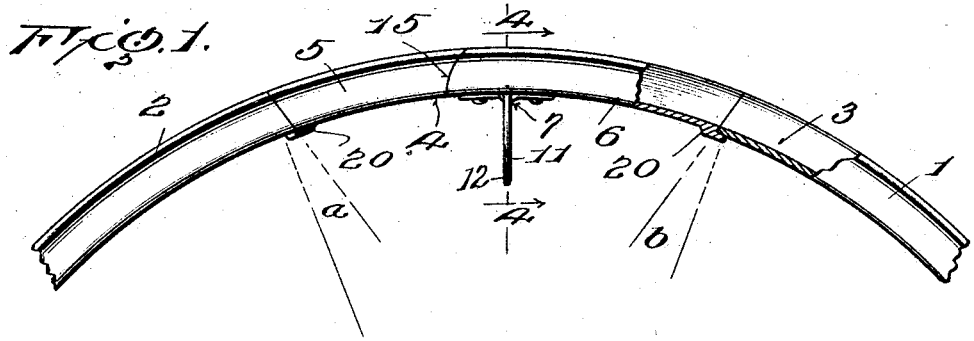
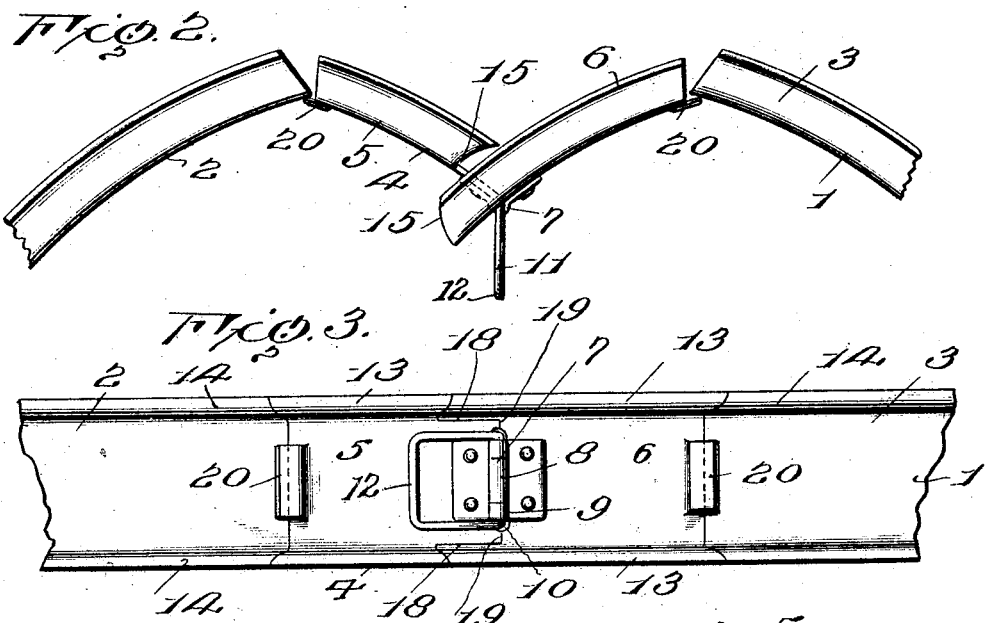
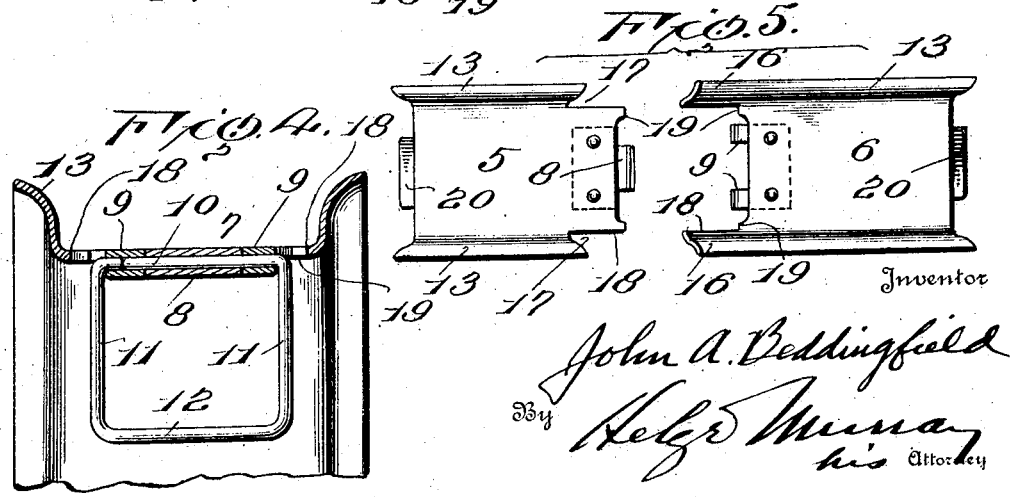
Inventor
John A. Beddingfield
By his Attorney

UNITED STATES PATENT OFFICE.

JOHN A. BEDDINGFIELD, OF FORT VALLEY, GEORGIA.

AUTOMOBILE TIRE RIM.

1,408,164. Specification of Letters Patent. Patented Feb. 28, 1922.

Application filed February 1, 1921. Serial No. 441,688.

*To all whom it may concern:*

Be it known that I, JOHN A. BEDDINGFIELD, a citizen of the United States, residing at Fort Valley, in the county of Houston, State of Georgia, have invented certain new and useful Improvements in Automobile Tire Rims, of which the following is a specification.

This invention relates to automobile tire rims, and more particularly stated contemplates a rim of the type set forth in U. S. Letters Patent No. 1,345,659 granted to me July 6, 1920.

An object of the present invention is to produce an automobile rim having a detachable rim section the annular side flanges of which are designed to meet and form uninterrupted annular side flanges as in the usual uncut rim, thereby providing complete protection and uniform support in the retention of the tire.

Another object of this invention is to provide a detachable rim section having a novel hinged joint arranged intermediate the ends of the rim section and designed to permit the annular side flanges and rim bases to meet and form a continuous circumferential support for the tire when positioned on the rim.

Another object of this invention is the production of a rim formed with a detachable section, the ends of said rim and detachable section being abutted in a plane at an angle to the radii of the rim for effecting the circumferential retention of the detachable rim section and maintaining a maximum uniform support for the tire.

A further object of the invention is to produce a tire rim having a detachable rim section and means for permitting the release of said detachable rim section when effecting the removal of the tire.

With these and other objects in view my invention further consists in the construction and arrangement of the several parts to be hereinafter described and pointed out in the appended claims.

In the accompanying drawings wherein is shown an embodiment of my invention:—

Fig. 1 is a view in side elevation, partly in section, showing a portion of the rim with the detachable section positioned therein;

Fig. 2 is a view in side elevation showing the detachable rim section in a collapsed position prior to its removal from the rim;

Fig. 3 is a plan view of a portion of the rim with the detachable rim section in place, looking toward the inner face of the rim;

Fig. 4 is a cross sectional view taken on the line 4—4 of Fig. 1; and

Fig. 5 is a separated plan view showing the construction of the hinged members forming the detachable rim section.

The present invention has been designed with a view to providing means for more effectively closing the gap or open portion in the rim, and also permit of the ready removal of the hinged section. Generally stated, my invention comprises a relatively permanent or non-collapsible rim section having an interrupted portion or gap therein, and a collapsible hinged member or toggle section adapted to be fitted into the said gap for completing the rim, the said collapsible member being formed with an intermediate hinge joint of novel construction and having end portions angularly associated with the ends of the non-collapsible rim section for maintaining the circumferential contour of the rim and provide for maximum support of the tire.

Referring to the drawings, the relatively permanent or non-collapsible rim section 1 is provided with an open segmental portion or gap between the ends 2 and 3 thereof for the reception of the collapsible rim section 4.

The collapsible or detachable rim section 4 is formed of members 5 and 6 held together intermediate their ends by means of the pivotal or hinge connection 7, the latter being preferably arranged beneath the tire supporting surface so as to provide a continuously smooth face upon which the tire is uniformly supported at all points. The length of these hinged members 5 and 6 may be varied as required and additional sections may be added. Complementary portions 8 and 9 of the hinge connection 7 are provided on each respective hinge member 5 and 6, and these portions may be riveted as shown, welded, formed integral therewith, or otherwise secured. The looped ends or bearings for the pivot pin 10 may also be varied, and I do not limit myself to the exact arrangement shown.

In the embodiment of my invention herein disclosed the pivot pin or pintle 10 is provided with extending arms 11 forming a handle 12. It is in the nature of a loop or bale as shown, although it will be understood that the handle may be of any other form and can be attached to the detachable rim section in any other manner. The provision of a handle serves to permit of the ready release of the detachable rim section as distinguished from dropping the rim and tire or forcing the rim section, as will be understood. It is also desirable to provide a handle which if carried by the rim section, can be snugly fitted against the rim when positioning the same upon the wheel.

Each hinge member 5 and 6 is provided with annular side flanges 13 forming continuations of the annular side flanges 14 formed on the rim section 1. The inner ends of the annular side flanges 13 are designed to meet on a curve or arc indicated at 15 (see Fig. 1), the said curve or arc being preferably struck from the center of the hinge or pivotal connection 7 and at a suitable distance therefrom to permit of proper collapse of the hinged members as shown in Fig. 2.

To obtain this hinged coaction between the respective hinged members 5 and 6, and at the same time provide for the continuous annular side flanges of the rim, the inner ends of the hinged members are cut or separated in an offset or staggered manner as best shown in Fig. 3. In the construction shown the hinged member 6 is formed with extending portions 16 constituting the side flanges 13, and a comparatively small portion of the base of the rim. The opposite hinged member 5 is cut away upon each side as shown at 17 to receive these extensions 16. The ends of the extensions 16 and the coacting meeting ends of the cut away portions are curved to form the arc 15 heretofore referred to. The longitudinal or circumferential line of separation of the respective hinged members is indicated upon each side thereof at 18, the said line of separation being at a point approximating the joining of the base of the rim and annular side flanges. It will be understood however, that I do not limit myself to this line of separation as it may be wholly within the base of the rim section, or extended further into the annular side flanges.

Coacting lugs 19 are also shown as further serving to complete the joint between the hinged sections, thereby preventing the entrance of dirt and other extraneous foreign substances which might affect the proper functioning and longevity of use of the tire.

By the foregoing construction it will be seen that the curved meeting ends of the hinged members form continuous side flanges and complete the rim, thereby providing for a maximum degree of rigidity and strength equal to the uncut rim now in use.

It will also be seen that the tire is completely supported and protected with the same degree of security as is now obtained with the uncut rim.

To retain the detachable rim section 4 in associated position within the rim section 1, fastening devices are provided. These fastening devices are in the form of lugs or projections 20, the ends of which extend under the ends 2 and 3 respectively of the non-collapsible rim section 1, and form seats into which the said ends 2 and 3 fit. These lugs may be of any desired width and can be riveted, welded, formed integral therewith (as shown), or otherwise secured, as will be understood.

As a further means of effectively retaining the detachable rim section 4 in position, the outer ends of the hinged members 5 and 6 are cut at an angle with respect to the radii of the wheel as indicated by the dot and dash lines $a$ and $b$ in Fig. 1. The respective ends 2 and 3 of the non-collapsible rim section are correspondingly cut, and the joint produced is one of rigidity and permanency equal in tire supporting strength to the uncut rim now in use.

The degree of the angle may be varied to more effectively distribute the pressure with the least possible strain upon the joint. The angle may also be varied according to the length of the collapsible segmental portion of the rim, and I do not limit myself to the exact showing set forth.

In use, the tire is put on, and the detachable rim section fitted in place by inserting the lugs 20 under the edges of the ends 2 and 3 of the non-collapsible rim section 1. In this position the hinged members 5 and 6 are extended as will be understood. Pressure is now applied to the collapsible member 4, and the hinged members 5 and 6 are gradually forced into place, the curved inner ends of said members meeting and the outer ends being abutted against the ends 2 and 3 to form the aforesaid angular joint, thereby completing the rim. The pressure used in forcing or snapping the collapsible member in place may be applied by the foot, or in any other manner as will be understood.

The tire may now be inflated to its proper pressure and the rim joints by reason of their construction may be said to be further strengthened to a maximum degree for the proper support of the tire.

In taking the tire off, the tube is deflated and the collapsible section is removed by dropping the tire or otherwise jarring the same. To facilitate the removal of the detachable rim section the handle 12 may be grasped and the rim section forcibly pulled from between the ends 2 and 3 of the rim section 1. Upon disassembling the rim the tire can be easily removed. The rim may be made of any desired material such as malleable steel, for example, due regard being had for such springlike tendencies as may be manifested by the ends 2 and 3. In practice I prefer to make the pivot pin 7 of brass or other non-corrosive or non-rust accumulating material. Other changes in material may likewise be effected to produce additional practical advantages.

Various changes in the form and arrangement of the several parts may be resorted to without departing from the scope of my invention, and I do not limit myself to the exact disclosures herein set forth.

I claim:

1. A flanged tire supporting rim comprising a section having an open portion or gap therein, a detachable rim section composed of toggle sections hinged together at their meeting ends beneath the tire supporting surface and having their free ends extending into and positioned within the aforesaid open portion for completing the rim, and means for securing the aforesaid sections together, their inner ends meeting in arcs of circles to form a smooth and uninterrupted tire support.

2. A tire supporting rim comprising a flanged section having an open portion or gap therein, a detachable rim section composed of movable flanged sections hinged together at their meeting ends and arranged to form an arcuate juncture of the flanges at a point remote from said hinge, and means for attaching the free ends of the said sections within the aforesaid open portion for completing the rim.

3. A detachable rim section for a tire supporting rim comprising relatively short sections hinged together and having their inner ends meeting in arcs of circles to form a smooth and uninterrupted tire support, said sections being adapted to operate as a toggle when positioned within the open portion or gap of the tire supporting rim.

In testimony whereof I affix my signature.

JOHN A. BEDDINGFIELD.